__United States Patent Office__

2,880,211
Patented Mar. 31, 1959

2,880,211

1 - [ARYL - (POLYCARBON - LOWER - ALIPHATIC)]-4-ACYLOXY-4-ARYLPIPERIDINES AND THEIR PREPARATION

Bill Elpern, Walnut Creek, Calif., assignor to Sterling Drug Inc., New York, N.Y., a corporation of Delaware No Drawing. Application April 2, 1956
Serial No. 575,321

27 Claims. (Cl. 260—294.3)

This invention relates to compositions of matter of the class of substituted piperidines and to processes for their preparation.

The invention here resides in the concept of a composition having a molecular configuration in which an aryl-(polycarbon-lower-aliphatic) radical is attached to the nitrogen atom of the piperidine ring of 4-acyloxy-4-arylpiperidines and to processes for physically embodying such concept.

Attempts have been made for some time to develop analgesics having high activity. The highly potent morphine has the disadvantages of causing nausea, vomiting, constipation, and respiratory depression, and for these reasons has been supplanted largely by meperidine, ethyl 4-phenyl-1-methylpiperidine-4-carboxylate, especially in obstetrics where depression of respiration is highly undesirable. Because of the relatively high dose required, meperidine has to be injected in hypertonic concentrations, with a consequent risk of irritation at the site of administration. This limits the choice of concentrations which can be used and restricts undesirably the free choice of optimum dosage. This situation is advantageously modified with the compounds of my invention since they are many times more potent as analgesics than meperidine and thus can be administered in smaller volumes of solution and at higher therapeutic levels of effectiveness without making the solution hypertonic. This reduces any tendency to undesirable accompanying irritation, and improves the therapeutic usefulness of the medicament.

U.S. Patent 2,167,351 broadly shows lower alkyl 4-aryl-1-(substituted)-piperidine-4-carboxylates where the 1-substituent is a monovalent hydrocarbon radical. Included among the specific examples are such compounds having 1-methyl and 1-benzyl substituents, the latter being of primary value as intermediates for the former. The 1-methyl compounds are now known and accepted as effective, morphine-like central analgesics and atropine-like smooth muscle neurospasmolytics in the relief of severe pain. An outstanding example of these 1-methyl compounds is the commercially available meperidine hydrochloride, ethyl 4-phenyl-1-methylpiperidine-4-carboxylate hydrochloride. On the other hand, the intermediate 1-benzyl compounds have been found to have a decidedly lower analgesic activity compared with the 1-methyl compounds. For example, ethyl 4-phenyl-1-benzylpiperidine-4-carboxylate as its hydrochloride has been found to be only approximately one-fourth as effective an analgesic as meperidine hydrochloride when tested in rats by the Bass-Vander Brook modification of the D'Amour-Smith method [J. Am. Pharm. Assoc., Sci. Ed., 41, 569–570 (1952)]. This decrease in activity in going from 1-methyl to 1-benzyl would indicate that 1-aralkyl substituents are undesirable, and would thus lead investigators away from these compounds and away from compounds such as those of my invention.

Similarly, Randall and Lehmann [J. Pharm. & Exptl. Therap., 93, 314 (1948)] in a study of analgesic activity of a series of 1-substituted-4-acyloxy-4-arylpiperidines found a decrease in activity in going from 1-methyl to 1-benzyl compounds. In fact, these investigators reported 1 - benzyl - 4 - propanoyloxy - 4 - phenylpiperidine hydrochloride to have "only very weak analgesic effect."

I have now prepared 1-[aryl-(polycarbon-lower-aliphatic)]-4-acyloxy-4-arylpiperidines and found them to be outstandingly superior as analgesics compared with the corresponding 1-benzyl compounds as shown by Randall and Lehmann and, in fact, to be many times more effective than the commercial analgesic meperidine hydrochloride. For example, my 1-(3-phenylpropyl)-4-acetoxy-4-phenylpiperidine as its hydrochloride salt when measured subcutaneously by the procedure mentioned above is approximately 200 times as potent an analgesic as meperidine hydrochloride and when measured intraperitoneally by the same method is approximately 75 times as potent an analgesic as meperidine hydrochloride and approximately 50 times as potent as the corresponding 1-benzyl-4-acetoxy-4-phenylpiperidine hydrochloride. In addition to having this high analgesic activity, my compounds have a relatively low toxicity; for example, said 1-(3-phenylpropyl)-4-acetoxy-4-phenylpiperidine hydrochloride when compared with meperidine hydrochloride is only about eight times as toxic in rats and only about twice as toxic in mice when measured intravenously by a procedure similar to that described by Hoppe et al., J. Pharm. & Exptl. Therap., 95, 502 (1949). Thus, the therapeutic index of 1-(3-phenylpropyl)-4-acetoxy-4-phenylpiperidine hydrochloride is at least about 25 times that of meperidine hydrochloride by the subcutaneous route.

Various illustrations of the 4-acyloxy-4-aryl-1-piperidyl radical are known in the art and include such groupings wherein the 4-acyloxy substituent is lower alkanoyloxy, benzoyloxy, furoyloxy, acroyloxy, ethoxyacetoxy, succinoyloxy, and the like; and wherein the 4-aryl radical is phenyl, (lower alkoxylated)phenyl, (lower alkylated) phenyl, naphthyl, and the like. The piperidine ring can also bear one or more lower alkyl radicals on the available carbon atoms at positions 2, 3, 5 or 6, as shown in the art. Thus, my new compounds can be represented by the formula

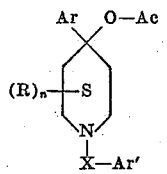

where Ar is an aryl radical of the benzene or naphthalene series, Ac is a lower carboxylic acyl radical, R is a lower alkyl radical, n is zero or an integer from 1 to 8, X is a divalent aliphatic hydrocarbon radical having from two to six carbon atoms and having its free valence bonds on different carbon atoms, and Ar' is an aryl radical of the benzene series.

The 4-aryl radical designated as Ar is an aryl group capable of forming an aryllithium or an arylmagnesium halide, and therefore can be phenyl or naphthyl or either of these bearing substituents unreactive to lithium or magnesium under the conditions of forming the aryllithium or arylmagnesium halide, such substituents preferably being lower alkyl and lower alkoxy groups. The number of such substituting groups can be up to five, preferably one to three, and where more than one can be the same or different and can be in any of the various position combinations relative to each other. The preferred substituents, lower alkyl and lower alkoxy, have preferably from one to six carbon atoms, including such substituents as: methyl, ethyl, n-propyl, isopropyl, n-butyl, isobutyl, 2-butyl, n-pentyl, isopentyl, n-hexyl, and the like, when lower alkyl; and methoxy, ethoxy, n-propoxy, isopropoxy, n-butoxy, isobutoxy, 2-butoxy, n-pentoxy, isopentoxy, n-hexoxy, and the like, when lower alkoxy.

The lower carboxylic acyl radical designated as Ac has preferably from two to seven carbon atoms and includes such radicals as alkanoyl, alkenoyl, alkoxyalkanoyl, carboxyalkanoyl, benzoyl, furoyl, and the like, and includes such examples as: ethanoyl (acetyl), propanoyl (propionyl), n-butanoyl, 2-methylpropanoyl, n-pentanoyl, n-hexanoyl, n-heptanoyl and the like, when alkanoyl; 2-propenoyl, 2-methylpropenoyl, 2-butenoyl, and the like, when alkenoyl; methoxyacetyl, ethoxyacetyl, n-propoxyacetyl, 3-methoxypropanoyl, and the like, when alkoxyalkanoyl; 3-carboxypropanoyl, 4-carboxybutanoyl, and the like, when carboxyalkanoyl.

The 4-acyloxy-4-aryl-1-piperidyl radical designated above as

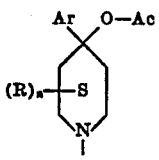

can be unsubstituted, as illustrated by the following formula (where n is zero),

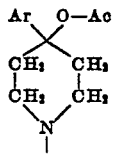

or can have up to 8, preferably 1 to 4, lower alkyl substituents, designated above as R, on the available carbon atoms at positions 2, 3, 5 or 6. R embraces lower alkyl radicals having from one to six carbon atoms, including such groups as: methyl, ethyl, n-propyl, isopropyl, n-butyl, isobutyl, 2-butyl, n-pentyl, n-hexyl, and the like.

The divalent aliphatic hydrocarbon radical designated above as X can be saturated or unsaturated and comprehends radicals such as —CH₂CH₂—, —CH₂CH₂CH₂—, —CH₂CH₂CH₂CH₂—, —CH₂CH₂CH₂CH₂CH₂—, —CH₂CH₂CH₂CH₂CH₂CH₂—

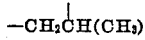

—CH(CH₃)CH₂—, —CH=CH—, —CH=CHCH₂—, —CH₂CH=CH—, —CH₂CH=CHCH₂—, —CH=CHCH₂CH₂CH₂—, —C≡C—, —C≡CCH₂—, —CH₂C≡CCH₂—, and the like.

The aryl radical designated above as Ar' is an aryl radical of the benzene series or, in other words, a monocarbocyclic aryl radical having six ring-carbon atoms. Thus Ar comprehends the unsubstituted phenyl radical and phenyl radicals bearing up to five substituents, preferably one to three. Preferred substituents are lower alkyl and lower alkoxy radicals having preferably from one to six carbon atoms, and including such substituents as those given above for the lower alkyl and lower alkoxy substituents of the 4-aryl radical, Ar.

Preferred embodiments of my invention include compounds wherein the 4-aryl radical, Ar, is the phenyl radical, the 4-acyloxy radical, Ac, is a lower alkanoyl radical having two to six carbon atoms, and the aryl radical, Ar', of the 1-[aryl(polycarbon-lower-aliphatic)] substituent is the phenyl radical. These preferred embodiments are the compounds having the formula

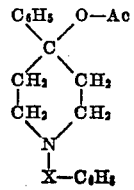

where X is a divalent aliphatic hydrocarbon radical having from two to six carbon atoms and having its free valence bonds on different carbon atoms, and Ac is an alkanoyl radical having two to six carbon atoms.

The 1-[aryl-(polycarbon-lower-aliphatic)]-4-acyloxy-4-arylpiperidines of my invention are prepared by reacting a 1-[aryl-(polycarbon-lower-aliphatic)]-4-piperidone with an aryllithium or an arylmagnesium halide and acylating the resulting 1-substituted-4-hydroxy-4-arylpiperidine, preferably as its lithium or magnesium halide salt. This method is illustrated structurally as follows:

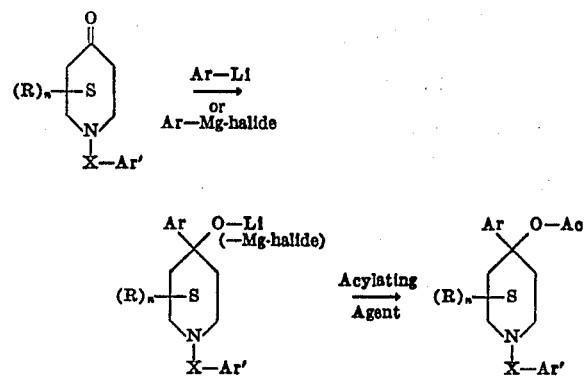

where R, n, X, Ar' and Ar have the meanings given above. Reaction of the piperidone with an aryllithium or arylmagnesium halide is carried out by heating the reactants in an inert medium, preferably a solvent mixture of ether and benzene. The resulting 1-[aryl-(polycarbon-lower-aliphatic)]-4-hydroxy-4-arylpiperidine, preferably as its lithium or magnesium halide salt, is reacted with an acylating agent, preferably by heating with an acyl anhydride of the formula Ac₂O in an inert solvent such as benzene or toluene. Alternatively, but less satisfactory, the acylation can be carried out using an acyl halide (Ac-halogen) in an inert basic solvent such as pyridine. Also, alternatively but less satisfactory, the lithium or magnesium halide salt can be hydrolyzed to the 1-substituted-4-hydroxy-4-arylpiperidine which, in turn, can be acylated. Illustrative of this procedure for the preparation of preferred embodiments is the reaction of 1-(3-phenylpropyl)-4-piperidone with phenyllithium to yield the lithium salt of 1-(3-phenylpropyl)-4-hydroxy-4-phenylpiperidine, which is then reacted with propanoic (propionic) anhydride to produce 1-(3-phenylpropyl)-4-propanoyloxy-4-phenylpiperidine. Use of the corresponding intermediate 1-(3-phenyl-2-propenyl)-4-piperidone, 1-(3-phenyl-2-propynyl)-4-piperidone, 1-(2-phenylethyl)-4-piperidone or 1-(4-phenylbutyl)-4-piperidone results in the formation of the 1-(3-phenyl-2-propenyl)-4-propanoyloxy-4-phenylpiperidine, 1-(3-phenyl-2-propynyl)-4-propanoyloxy-4-phenylpiperidine, 1-(2-phenylethyl)-4-propanoyloxy-4-phenylpiperidine or 1-(4-phenylbutyl)-4-propanoyloxy-4-phenylpiperidine, respectively.

The intermediate 1-[aryl-(polycarbon-lower-aliphatic)]-4-piperidones bearing no alkyl substituents on the 2, 3, 5 or 6 positions of the piperidone ring are prepared by reacting an aryl-aliphatic-amine, Ar'—X—NH₂, with at least two molar equivalents of a lower alkyl acrylate to yield an N,N-bis(carbalkoxyethyl)-N-(aryl-aliphatic)amine, heating this bis-ester with a strong basic condensing agent such as sodium or sodium hydride in an inert solvent medium such as benzene to form a 1-[aryl-(polycarbon-lower-aliphatic)]-3-carbalkoxy-4-piperidone, and refluxing an acidic aqueous solution of the latter compound to effect hydrolysis and decarboxylation of the 3-carbalkoxy substituent to yield the intermediate 1-substituted-4-piperidone. This preparation is illustrated structurally as follows using methyl acrylate, a preferred reactant because of its low cost and ready availability:

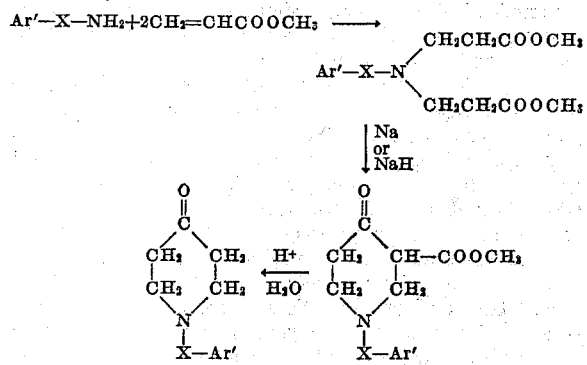

Other intermediate 1-[aryl-(polycarbon-lower-aliphatic)]-4-piperidones bearing one to eight, preferably one to four, lower alkyl radicals as substituents of the piperidone ring at any of its available positions (2, 3, 5 or 6) can be prepared by the above procedure using other lower alkyl 2-alkenoates in place of methyl acrylate (methyl 2-propenoate) to produce symmetrically substituted piperidones, e.g., 1-(3-phenylpropyl)-3,5-dimethyl-4-piperidone from 3 - phenylpropylamine and methyl methacrylate (methyl 2-methyl-2-propenoate), or 1-(3-phenyl-2-propenyl) - 2,6-dimethyl-4-piperidone from 3-phenyl-2-propenylamine and methyl crotonate (methyl 2-butenoate), 1-(3-phenylpropyl)-2,3,5,6-tetramethyl-4-piperidone from 3-phenylpropylamine and methyl 2-methyl-2-butenoate; or by applying other known procedures of preparing 1-(lower alkyl)-(alkylated)-4-piperidones to produce unsymmetrically or symmetrically alkylated piperidones, e.g., such intermediates being 1 - (3-phenylpropyl)-3-methyl-4-piperidone [Howton, J. Org. Chem., 10, 277 (1945) prepared the corresponding 1-methyl compound], 1 - (2-phenylethyl)-2,2,6-trimethyl-4-piperidone [Harries, Ann., 417, 166 (1918) prepared the corresponding 1-methyl compound], 1-(4-phenylbutyl)-3,5-di-n-propyl-4-piperidone [Mannich et al., Ber., 69B, 2299 (1936) prepared the corresponding 1-methyl compound], 1-(3-phenylpropyl)-2,5-dimethyl-4-piperidone [Nazarov et al., Chem. Abstr., 48, 1357 (1954) prepared the corresponding 1-phenyl compound].

My new 1-[aryl-(polycarbon-lower-aliphatic)]-4-acyloxy-4-arylpiperidines are useful in the free base form or in the form of acid addition salts, and both forms are within the purview of the invention. The acids which can be used to prepare acid addition salts are preferably those which produce, when combined with the free base, salts whose anions are relatively innocuous to the animal organism in therapeutic doses of the salts, so that the beneficial physiological properties inherent in the free base are not vitiated by side effects ascribable to the anions. In practicing my invention, I found it convenient to employ the hydrochloride salt. However, other appropriate acid addition salts are those derived from mineral acids such as hydrobromic acid, hydriodic acid, nitric acid, phosphoric acid and sulfuric acid; and organic acids such as acetic acid, citric acid, tartaric acid, lactic acid, quinic acid, methanesulfonic acid, ethanesulfonic acid, and the like, giving the hydrobromide, hydriodide, nitrate, phosphate or acid phosphate, sulfate or acid sulfate, acetate, citrate or acid citrate, tartrate or acid tartrate, lactate, quinate, methanesulfonate and ethanesulfonate salts, respectively.

The following examples will further illustrate the invention without, however, limiting it thereto.

EXAMPLE 1

A. *1-(aralkyl)-4-piperidones*

The preparation of these compounds is illustrated by the following synthesis of 1-(3-phenylpropyl)-4-piperidone: 3-phenylpropylamine (83 g.) was dissolved in 120 ml. of methanol, the solution cooled in an ice bath and 162 g. of methyl acrylate added dropwise while maintaining the internal temperature below 10° C. The stoppered reaction mixture was then allowed to stand at room temperature for a week. Alternatively, this reaction can be carried out by refluxing the reaction mixture for about five to eight hours, using preferably about three molar equivalents of methyl acrylate per mole of 3-phenylpropylamine. The clear dark solution was concentrated by distilling in vacuo, and the residual oil distilled to give 169.3 g. of N,N - bis(2-carbomethoxyethyl)-3-phenylpropylamine, a straw-colored oil boiling at 161–162° C. at 0.4 mm. and having an $n_D^{27}$ of 1.4970.

*Analysis.*—Calcd. for $C_{17}H_{25}NO_4$: N, 4.56; O, 20.82. Found: N, 4.63; O, 21.15.

To a stirred mixture containing 12.4 g. of finely divided sodium suspended in 270 ml. of toluene maintained at 90° C. was added dropwise 164 g. of N,N-bis(2-carbomethoxyethyl)-3-phenylpropylamine. The addition required about twenty minutes, and heating with stirring was continued for an additional three hours. The reaction mixture was then carefully diluted with 250 ml. of water, the organic layer separated and washed with water (three 150 ml. portions). A solid product, 1-(3-phenylpropyl)-3-carbomethoxy-4-piperidone, was obtained when the combined aqueous portions where treated with sodium hydroxide solution. The solid was collected, dissolved in aqueous hydrochloric acid (pH of resulting solution about 2), and the acidic solution then refluxed until a test drop gave only a faint color with ferric chloride, indicating completion of the decarboxylation step. After most of the water had been removed in vacuo, the residual solution was made basic and extracted with benzene. The organic layer was washed with water and then distilled, first to remove the benzene and then to yield a fraction boiling at 191° C. at 16 mm. This fraction was redistilled to give 27.5 g. of 1-(3-phenylpropyl)-4-piperidone, distilling at 114–115° C. at 0.2 mm. and having an $n_D^{24}$ of 1.5325.

*Analysis.*—Calcd. for $C_{14}H_{19}NO$: C, 77.38; H, 8.81; O, 7.36. Found: C, 77.11; H, 8.84; O, 7.10.

The above procedure was also successfully carried out to yield the same product using an equivalent amount of sodium hydride in place of sodium.

1-(4-phenylbutyl)-4-piperidone was prepared following the above procedure using the appropriate reactants and using sodium hydride instead of sodium in the cyclization of N,N - bis(2 - carbomethoxyethyl) - 4 - phenylbutylamine, as follows: A theoretical yield (162. g.) of N,N - bis(2 - carbomethoxyethyl) - 4 - phenylbutylamine, B.P. 152–153° C. at 0.1 mm., was obtained using 75 g. of 4-phenylbutylamine and 132 cc. of methyl acrylate in 100 cc. of methanol. [*Analysis.*—Calcd. for $C_{18}H_{24}NO_4$: C, 67.26; H, 8.47; N, 4.36. Found: C, 67.36; H, 8.52; N, 4.34.] The cyclization of N,N-bis(2-carbomethoxyethyl)-4-phenylbutylamine to produce 1-(4-phenylbutyl)-3-carbomethoxy-4-piperidone was effected using 11.5 g. of sodium hydride and 64 g. of the bis-ester in 400 cc. of dry benzene. Hydrolysis and decarboxylation of the 3-carbomethoxypiperidone was effected as above to yield 21 g. of 1-(4-phenylbutyl)-4-piperidone, B.P. 135–136° C. at 0.3 mm.

*Analysis.*—Calcd. for $C_{15}H_{21}NO$: C, 77.88; H, 9.15; O, 6.92. Found: C, 77.83; H, 9.02; O, 6.75.

1-(2-phenylethyl)-4-piperidone was prepared following the above procedure for the preparation of the corresponding 1-(4-phenylbutyl)-4-piperidone, as follows: There was obtained 72 g. of N,N-bis(2-carbomethoxyethyl)-2-phenylethylamine, B.P. 148° C. at 0.1 mm. using 30 g. of 2-phenylethylamine and 66 ml. of methyl acrylate. Cyclization of the bis-ester was effected using 14.2 g. of sodium hydride and 72 g. of the bis-ester. Hydrolysis and decarboxylation of the 3-carbomethoxy compound was effected as above to yield 35 g. of 1-(2- phenylethyl)-4-piperidone, B.P. 117–118° C. at 0.1 mm., a white oil that readily crystallized.

Other 1-(aralkyl)-4-piperidones bearing one or more lower alkyl radicals at the 2, 3, 5 or 6 positions of the piperidone ring can be prepared following the above procedure for the preparation of 1-(3-phenylpropyl)-4-piperidone using other lower alkyl 2-alkenoates in place of methyl acrylate or following procedures described in the literature for the preparation of corresponding 1-methyl (or phenyl)-(alkylated)-4-piperidones using the appropriate aralkylamine in place of methylamine or aniline. For example, following the above described procedure but using methyl methacrylate (methyl 2 - methyl - 2 - propenoate), methyl crotonate (methyl 2-butenoate) or methyl 2-methyl-2-butenoate in place of methyl acrylate, there is obtained 1-(3-phenylpropyl)-3,5 - dimethyl - 4 - piperidone, 1 - (3 - phenylpropyl)-2,6 - dimethyl - 4 - piperidone or 1 - (3 - phenylpropyl)-2,3,5,6-tetramethyl-4-piperidone, respectively. Following the procedure described by Howton, ibid., for the preparation of 1,3-dimethyl-4-piperidone using 3-phenylpropylamine in place of methylamine 1-(3-phenylpropyl-3-methyl-4-piperidone is obtained; or following the procedure of Harries, ibid., for the preparation of 1,2,2,6-tetramethyl-4-piperidone using 2-phenylethylamine in place of methylamine, 1-(2-phenylethyl)-2,2,6-trimethyl-4-piperidone is obtained; or following the procedure of Mannich et al., ibid., for the preparation of 1-methyl-3,5-di-n-propyl-4-piperidone using 4-phenylbutylamine in place of methylamine, 1-(4-phenylbutyl)-3,5-di-n-propyl-4-piperidone is obtained; or following the procedure of Nazarov et al., ibid., for the preparation of 1-phenyl-2,5-dimethyl-4-piperidone using 3-phenylpropylamine in place of aniline, 1-(3-phenylpropyl)-2,5-dimethyl-4-piperidone is obtained.

Other 1-(aralkyl)-4-piperidones can be prepared following the above procedure for the preparation of 1-(3-phenylpropyl)-4-piperidone using other aralkylamines in place of 3-phenylpropylamine, as follows: 1-[2-(3-methylphenyl)ethyl]-4-piperidone using 2-(3-methylphenyl)-ethylamine; 1-[2-(2,4-diethylphenyl)ethyl]-4-piperidone using 2-(2,4-diethylphenyl)-ethylamine; 1-[3-(2,4,6-trimethylphenyl)propyl]-4-piperidone using 3-(2,4,6-trimethylphenyl)propylamine; 1 - [2 - (3 - n - butylphenyl)-ethyl]-4-piperidone using 2-(3-n-butylphenyl)ethylamine; 1-[2-(4-n-hexylphenyl)ethyl]-4-piperidone using 2-(4-n-hexylphenyl)ethylamine; 1 - [3 -( 4 - n - butoxyphenyl)-propyl]-4-piperidone using 3-(4-n-butoxyphenyl)propylamine; 1-[2-(3,4,5-trimethoxyphenyl)ethyl]-4-piperidone using 2-(3,4,5-trimethoxyphenyl)ethylamine; 1-[3-(3,4-diethoxyphenyl)propyl]-4-piperidone using 3-(3,4-diethoxyphenyl)propylamine; 1 - [2 - (4 - n - hexoxyphenyl)-ethyl] - 4 - piperidone using 2 - (4 - n - hexoxyphenyl)-ethylamine; 1-[3-(2-methoxy-4-isopropylphenyl)propyl]-4-piperidone using 3-(2-methoxy-4-isopropylphenyl)propylamine; and the like.

Following the above procedure used for the preparation of 1-(3-phenylpropyl)-4-piperidone but using 5-phenylpentylamine or 6-phenylhexylamine in place of 3-phenylpropylamine, there is obtained 1-(5-phenylpentyl)-4-piperidone or 1-(6-phenylhexyl)-4-piperidone, respectively.

B. 1-(aralkyl)-4-acyloxy-4-arylpiperidines

The preparation of these compounds is illustrated by the following synthesis of 1-(3-phenylpropyl)-4-acetoxy-4-phenylpiperidine: Phenyllithium was prepared from 19.6 g. of bromobenzene and 1.64 g. of lithium wire in 90 ml. of ether. While cooling the suspension of phenyllithium in an ice bath, a solution of 15.7 g. of 1-(3-phenylpropyl)-4-piperidone in 150 ml. of benzene was added. The mixture was refluxed for ninety minutes to yield a solution of 1-(3-phenylpropyl)-4-hydroxy-4-phenylpiperidine as its lithium salt. The ether was then removed by distillation and the resulting mixture cooled to 5° C. A solution of 30 g. of acetic anhydride in 60 ml. of benzene was added dropwise with stirring over a period of about twenty minutes. The resulting mixture was diluted to a volume of about 475 ml. with benzene and slowly heated to reflux. The reaction mixture was then refluxed for thirty minutes, allowed to stand overnight at room temperature, and then poured into a mixture of ice and water (about 100 ml.). Concentrated hydrochloric acid (about 100 ml.) was added carefully along with some ice. The solid that separated was collected, washed with water and suspended in benzene; and the benzene suspension was made alkaline with 10% sodium hydroxide solution. The organic layer was separated and the aqueous layer extracted with benzene. The combined organic extracts were washed with water and concentrated to yield a dark red oil. This oily product was dissolved in n-pentane, filtered and the filtrate evaporated at room temperature in vacuo. The resulting red crystalline material, which contained 1-(3-phenylpropyl)-4-acetoxy-4-phenylpiperidine in free base form, was dissolved in about 300 ml. of ether and ethereal HCl was added to yield 17.1 g. of product, 1-(3-phenylpropyl)-4-acetoxy-4-phenylpiperidine as its hydrochloride salt, M.P. 182.6–185.8° C. (corr.).

*Analysis.*—Calcd. for $C_{22}H_{27}NO_2 \cdot HCl$: C, 70.68; H, 7.55; Cl, 9.48. Found: C, 70.40; H, 7.79; Cl, 9.32.

1-(3-phenylpropyl)-4-acetoxy-4-phenylpiperidine is obtained in its free base form by dissolving the hydrochloride salt in water, treating the aqueous solution with sodium hydroxide solution, extracting the liberated basic product with benzene, drying the benzene extract over anhydrous sodium sulfate, and removing the benzene by distilling in vacuo.

Following the above procedure but using phenylmagnesium bromide in place of phenyllithium or using acetyl chloride in place of acetic anhydride as the acetylating agent, the same product is obtained.

Additional 1-(3-phenylpropyl)-4-alkanoyloxy-4-phenylpiperidines are obtained following the above procedure but using other alkanoic anhydrides in place of acetic anhydride: for example, using propanoic anhydride, butanoic anhydride, 2-methylpropanic anhydride, n-pentanoic anhydride or n-hexanoic anhydride, there are obtained 1-(3-phenylpropyl)-4-propanoyloxy-4-phenylpiperidine, 1-(3-phenylpropyl)-4-n-butanoyloxy-4-phenylpiperidine, 1-(3-phenylpropyl) - 4 - (2-methylpropanoyloxy)-4-phenylpiperidine, 1-(3-phenylpropyl)-4-n-pentanoyloxy-4-phenylpiperidine or 1-(3-phenylpropyl)-4-n-hexanoyloxy-4-phenylpiperidine, respectively. Following the same procedure but using 1-(5-phenylpentyl)-4-piperidone or 1-(6-phenylhexyl)-4-piperidone in place of 1-(3-phenylpropyl)-4-piperidone and acetic anhydride as the acylating agent, there is obtained 1-(5-phenylpentyl)-4-acetoxy-4 - phenylpiperidine or 1 - (6 - phenylhexyl)-4-acetoxy-4-phenylpiperidine, respectively.

Pharmacological evaluation of 1-(3-phenylpropyl)-4-acetoxy-4-phenylpiperidine hydrochloride in aqueous solution administered subcutaneously by the Rat Thermal Stimulus Method of Bass and Vander Brook, ibid., has shown that this compound is approximately 200 times as potent an analgesic as ethyl 4-phenyl-1-methylpiperidine-4-carboxylate hydro chloride. This compound was found to have an acute toxicity of 4.7±0.4 mg. per kg. in rats and of 15.8±0.6 mg. per kg. in mice when administered intravenously in aqueous solution.

1-(4-phenylbutyl)-4-acetoxy - 4 - phenylpiperidine was prepared following the procedure described above for the preparation of the corresponding 1-(3-phenylpropyl)-piperidine using 18 g. of 1-(4-phenylbutyl)-4-piperidone, phenyllithium prepared from 1.77 g. of lithium and 21.2 g. of bromobenzene in 100 ml. of dry ether, and then using 32.4 g. of acetic anhydride in the acetylation of the lithium salt of 1-(4-phenylbutyl)-4-hydroxy-4-phenylpiperidine. There was thus obtained 17 g. of 1-(4-phenylbutyl)-4-acetoxy-4-phenylpiperidine hydrochloride, M.P.

199.0–200.0° C. (corr.) when recrystallized from ethanol.

*Analysis.*—Calcd. for $C_{23}H_{29}NO_2 \cdot HCl$: C, 71.21; H, 7.80; Cl, 9.14. Found: C, 71.12; H, 7.67; Cl, 8.83.

Pharmacological evaluation of 1 - (4 - phenylbutyl)-4-acetoxy-4-phenylpiperidine hydrochloride in aqueous solution administered subcutaneously as described above has shown that this compound is approximately 42 times as potent an analgesic as ethyl 4-phenyl-1-methylpiperidine-4-carboxylate hydrochloride. This compound was found to have an acute toxicity of 5.6±0.6 mg. per kg. in rats and of 11.8±1.04 mg. per kg. in mice when administered intravenously in aqueous solution.

1-(4-phenylbutyl)-4-propanoyloxy - 4 - phenylpiperidine was prepared following the procedure described above for the preparation of the corresponding 4-acetoxy compound using 18 g. of 1-(4-phenylbutyl)-4-piperidone, phenyllithium prepared from 1.77 g. of lithium in 100 ml. of dry ether and 14.2 ml. of bromobenzene in 25 ml. of dry benzene, and then using 41 ml. of propanoic (propionic) anhydride in 65 ml. of dry benzene in the acylation of the lithium salt of 1-(4-phenylbutyl)-4-hydroxy-4-phenylpiperidine. There was thus obtained 16 g. of 1-(4-phenylbutyl)-4-propanoyloxy-4-phenylpiperidine hydrochloride, M.P. 173.0–175.8° C. (corr.) when recrystallized from ethanol-ether.

*Analysis.*—Calcd. for $C_{24}H_{31}NO_2 \cdot HCl$: C, 71.70; H, 8.03; Cl, 8.82. Found: C, 71.87; H, 8.04; Cl, 8.64.

Pharmacological evaluation of 1-(4-phenylbutyl)-4-propanoyloxy-4-phenylpiperidine hydrochloride in aqueous solution administered subcutaneously as described above has shown that this compound is approximately 112 times as potent an analgesic as ethyl 4-phenyl-1-methylpiperidine-4-carboxylate hydrochloride.

1-(2-phenylethyl)-4-acetoxy - 4 - phenylpiperidine was prepared following the procedure described above for the preparation of the corresponding 1-(3-phenylpropyl)-piperidine using 20.3 g. of 1-(2-phenylethyl)-4-piperidone, phenyllithium prepared from 2.24 g. of lithium and 18.1 ml. of bromobenzene in 170 ml. of dry ether, and then using 38.5 g. of acetic anhydride in the acylation of the lithium salt of 1-(2-phenylethyl)-4-hydroxy-4-phenylpiperidine. There was thus obtained 24 g. of 1-(2-phenylethyl)-4-acetoxy-4-phenylpiperidine hydrochloride, M.P. 213.4–214.4° C. (corr.) with decomposition when recrystallized from ethanol.

*Analysis.*—Calcd. for $C_{21}H_{25}NO_2 \cdot HCl$: C, 70.08; H, 7.28; Cl, 9.85. Found: C, 69.63, 69.86; H, 6.92, 6.76; Cl, 9.82.

Pharmacological evaluation of 1-(2-phenylethyl)-4-acetoxy - 4 - phenylpiperidine hydrochloride in aqueous solution administered subcutaneously as described above has shown that this compound is approximately 40 times as potent an analgesic as ethyl 4-phenyl-1-methyl-piperidine-4-carboxylate hydrochloride. This compound was found to have an acute toxicity of 9.6±1.5 mg. per kg. in rats and of 16.0±1.1 mg. per kg. in mice when administered intravenously in aqueous solution.

Other 1-(phenylalkyl)-4-acyloxy - 4 - phenylpiperidines that are obtained following the above procedure for the preparation of 1-(3-phenylpropyl)-4-acetoxy-4-phenylpiperidine using the appropriate 1-(phenylalkyl)-4-piperidone and acylating agent are: 1-(3-phenylpropyl)-3,5-dimethyl-4-acetoxy-4-phenylpiperidine using 1-(3-phenylpropyl)-3,5-dimethyl-4-piperidone and acetic anhydride; 1-(3-phenylpropyl)-2,6-dimethyl-4-acetoxy-4-phenylpiperidine using 1-(3-phenylpropyl)-2,6-dimethyl-4-piperidone and acetic anhydride; 1-(3-phenylpropyl)-2,3,5,6-tetramethyl-4-acetoxy-4-phenylpiperidine using 1-(3-phenylpropyl)-2,3,5,6-tetramethyl-4-piperidone and acetic anhydride; 1-(3-phenylpropyl)-3-methyl-4-propanoyloxy-4-phenpylpiperidine using 1-(3-phenpylpropyl)-3-methyl-4-piperidone and propanoic anhydride; 1-(2-phenylethyl)-2,2,6-trimethyl-4-n-butanoyloxy-4-phenylpiperidine using 1-(2-phenylethyl)-2,2,6-trimethyl-4-piperidone and n-butanoic anhydride; 1-(4-phenylbutyl)-3,5-di-n-propyl-4-acetoxy-4-phenylpiperidine using 1-(4-phenylbutyl)-3,5-di-n-propyl-4-piperidone and acetic anhydride; and 1-(3-n-propyl-4-piperidone and acetic anhydride; and 1-(3-phenylpropyl)-2,5-dimethyl-4 - propanoyloxy - 4 - phenylpiperidine using 1-(3-phenylpropyl)-2,5-dimethyl-4-piperidone and propanoic anhydride. These compounds can be isolated in their free base form or in the form of their acid addition salts, preferably the hydrochlorides.

Other 1-(aralkyl)-4-acyloxy-4-arylpiperidines that are obtained following the above procedure for the preparation of 1-(3-phenylpropyl)-4-acetoxy-4-phenylpiperidine using the appropriate 1-(aralkyl)-4-piperidone, aryllithium and acylating agent are: 1-[2-(3-methylphenyl)ethyl]-4-acetoxy-4-(3-methylphenyl)piperidine using 1-[2-(3-methylphenyl)ethyl]-4-piperidone, 3 - methylphenyllithium and acetic anhydride; 1-[2-(2,4-diethylphenyl)-ethyl]-4-ethoxyacetoxy-4 - (4 - ethoxyphenyl) - piperidine using 1-[2-(2,4-diethylphenyl)ethyl]-4-piperidone, 4-ethoxyphenyllithium and ethoxyacetic anhydride; 1-[3-(2,4,6-trimethylphenyl)-propyl]-4-(3 - carboxypropanoyl) - 4-phenylpiperidine using 1-[3-(2,4,6 - trimethylphenyl)-propyl]-4-piperidone, phenyllithium and succinic anhydride; 1-[2-(3-n-butylphenyl)ethyl]-4-propanoyloxy-4-(2,4,6-trimethylphenyl)piperidine using 1-[2-(3-n-butylphenyl)ethyl]-4-piperidone, 2,4,6-trimethylphenyllithium and propanoic anhydride; 1-[2-(4-n-hexylphenyl)ethyl]-4-benzoyloxy-4-(3,4-dimethoxyphenyl)piperidine using 1-[2-(4-n-hexylphenyl)ethyl]-4-piperidone, 3,4-dimethoxyphenyllithium and benzoyl chloride; 1-[3-(4-n-butoxyphenyl) - propyl] - 4 - (2-propenoyloxy)-4-(2,6-di-n-propylphenyl)-piperidine using 1-[3-(4-n-butoxyphenyl)propyl]-4-piperidone, 2,6-di-n-propylphenyllithium and 2-propenoic anhydride; 1-[2-(3,4,5-trimethoxyphenyl)ethyl]-4-acetoxy-4-(4-n-hexoxyphenyl)piperidine using 1-[2-(3,4,5-trimethoxyphenyl)-ethyl]-4 - piperidone, 4-n-hexoxyphenyllithium and acetic anhydride; 1-[3-(3,4-diethoxyphenyl)propyl]-4-furoyloxy-4-(4-n-butylphenyl)piperidine using 1-[3-(3,4-diethoxyphenyl)-propyl]-4-piperidone, 4-n-butylphenyllithium and furoic acid chloride; 1-[2-(4-n-hexoxyphenyl)ethyl]-4-propanoyloxy-4-(1 - naphthyl)piperidine using 1-[2-(4-n-hexoxyphenyl)ethyl]-4-piperidone, 1-naphthyllithium and propanoic anhydride; 1-[3-(2-methoxy-4-isopropylphenyl)propyl] - 4 - acetoxy-4-(2-naphthyl)piperidine using 1-[3-(2-methoxy-4-isopropylphenyl)propyl]-4-piperidone, 2 - naphthyllithium and acetic anhydride; 1-(3-phenylpropyl)-4-propanoyloxy-4-(4-methyl-6-ethoxy-1-naphthyl)piperidine using 1-(3-phenylpropyl)-4-piperidone, 4 - methyl - 6 - ethoxy-1-naphthyllithium and propanoic anhydride; 1-(2-phenylethyl)-4-acetoxy-4-(2,4,6 - triethoxyphenyl) - piperidine using 1-(2-phenylethyl-4-piperidone, 2,4,6-triethoxyphenyllithium and acetic anhydride.

EXAMPLE 2

A. *1-(aryl-alkenyl)-4-piperidones*

The preparation of these compounds is illustrated by the following preparation of 1-(3-phenyl-2-propenyl)-4-piperidone which was prepared following the procedure described above in Example 1A for the preparation of the corresponding 1-(3-phenylpropyl)-4-piperidone, using 66 g. of 3-phenyl-2-propenylamine and 132 ml. of methyl acrylate in 100 ml. of methanol to produce 148 g. of the intermediate N,N-bis(2-carbomethoxyethyl)-3-phenyl-2-propenylamine. This intermediate bis-ester was not distilled due to a tendency to decompose at the boiling point; so it was used without distillation in the next step. Cyclization of the bis-ester was carried out as above using 11 g. of sodium hydride and 61 g. of N,N-bis(2-carbomethoxyethyl)-3-phenyl-2-propenylamine in 400 ml. of dry benzene to yield 1-(3-phenyl-2-propenyl)-3-carbomethoxy-4-piperidone. Hydrolysis and decarboxylation of this 3-carbomethoxy compound was carried out as above resulting in the formation of 21 g. of 1-(3-phenyl-2-propenyl)-4-piperidone, B.P. 130° C. at 0.2 mm. A sample of this compound was converted into its hydrochloride by dissolving it in ether and adding ethereal hydrogen chloride to the solution. The resulting white crystals were collected and dried to yield 1-(3-phenyl-2-propenyl)-4-piperidone hydrochloride, M.P. 202–204° C. with decomposition.

*Analysis.*—Calcd. for $C_{14}H_{17}NO \cdot HCl$: Cl, 14.1. Found: Cl, 13.79.

Other 1-(phenyl-alkenyl)-4-piperidones bearing lower alkyl radicals at one or more of the 2, 3, 5 or 6 positions of the piperidone ring can be prepared following the above procedure but using other lower alkyl 2-alkenoates in place of methyl acrylate or following procedures described in the literature for the preparation of 1-methyl-(alkylated)-4-piperidones. For example, following the above described procedure but using methyl methacrylate or methyl crotonate in place of methyl acrylate, there is obtained 1-(3-phenyl-2-propenyl)-3,5-dimethyl-4-piperidone or 1-(3-phenyl-2-propenyl)-2,6-dimethyl-4-piperidone, respectively. Following the procedure described by Howton, ibid., for the preparation of 1,3-dimethyl-4-piperidone using 3-phenyl-2-propenylamine in place of methylamine, 1-(3-phenyl-2-propenyl)-3-methyl-4-piperidone is obtained.

Other 1-(aryl-alkenyl)-4-piperidones that can be prepared following the above procedure for the preparation of 1-(3-phenyl-2-propenyl)-4-piperidone using the appropriate aryl-alkenylamine are: 1-[3-(4-ethoxyphenyl)-2-propenyl]-4-piperidone using 3-(4-ethoxyphenyl)-2-propenylamine; 1-[3-(3-methylphenyl)-2-propenyl]-4-piperidone using 3-(3-methylphenyl)-2-propenylamine; 1-[4-(3,4-dimethoxyphenyl)-2-butenyl]-4-piperidone using 4-(3,4-dimethoxyphenyl)-2-butenylamine; 1-[3-(2-n-butoxy-4-n-hexylphenyl)-2-propenyl]-4-piperidone using 3-(2-n-butoxy-4-n-hexylphenyl)-2-propenylamine; 1-[3-(2,4,6-trimethylphenyl)-2-propenyl]-4-piperidone using 3-(2,4,6-trimethylphenyl)-2-propenylamine; and the like.

B. *1-(aryl-alkenyl)-4-acyloxy-4-phenylpiperidines*

The preparation of these compounds is illustrated by the following synthesis of 1-(3-phenyl-2-propenyl)-4-acetoxy-4-phenylpiperidine which was prepared following the procedure described above in Example 1B for the preparation of 1-(3-phenylpropyl)-4-acetoxy-4-phenylpiperidine, using 18 g. of 1-(3-phenyl-2-propenyl)-4-piperidone and phenyllithium prepared from 1.88 g. of lithium and 15.2 ml. of bromobenzene in 165 ml. of dry ether to obtain the intermediate 1-(3-phenyl-2-propenyl)-4-hydroxy-4-phenylpiperidine as its lithium salt and then using 32.2 ml. of acetic anhydride in the acylation step. The resulting product, 1-(3-phenyl-2-propenyl)-4-acetoxy-4-phenylpiperidine hydrochloride, melted at 202-203° C. (corr.) when recrystallized from ethanol-ether.

*Analysis.*—Calcd. for $C_{22}H_{25}NO_2 \cdot HCl$: C, 71.05; H, 7.05; Cl, 9.53. Found: C, 71.06; H, 7.24; Cl, 9.43.

1-(3-phenyl-2-propenyl)-4-acetoxy-4-phenylpiperidine in free base form is obtained following the procedure given above in Example 1B for the preparation of 1-(3-phenylpropyl)-4-acetoxy-4-phenylpiperidine in free base form.

Pharmacological evaluation of 1-(3-phenyl-2-propenyl)-4-acetoxy-4-phenylpiperidine hydrochloride in aqueous solution administered subcutaneously as described above has shown that this compound is approximately 350 times as potent an analgesic as ethyl 4-phenyl-1-methylpiperidine-4-carboxylate hydrochloride. This compound was found to have an acute toxicity of 17.5±0.5 mg. per kg. in mice when administered intravenously in aqueous solution.

1-(3-phenyl-2-propenyl)-4-propanoyloxy-4-phenylpiperidine was prepared following the procedure described above for the preparation of the corresponding 4-acetoxy compound using propanoic anhydride in place of acetic anhydride in the acylation step. The resulting product, 1-(3-phenyl-2-propenyl)-4-propanoyloxy-4-phenylpiperidine, was isolated as its hydrochloride having the M. P. (uncorr.) 187–189° C. when recrystallized from ethanol-ether.

Other 1-(3-phenyl-2-alkenyl)-4-acyloxy-4-phenylpiperidines that can be obtained following the above procedure for the preparation of 1-(3-phenyl-2-propenyl)-4-acetoxy-4-phenylpiperidine using the appropriate 1-(3-phenyl-2-propenyl)-alkylated-4-piperidone and acylating agent are: 1-(3-phenyl-2-propenyl)-3,5-dimethyl-4-acetoxy-4-phenylpiperidine using 1-(3-phenyl-2-propenyl)-3,5-dimethyl-4-piperidone and acetic anhydride; 1-(3-phenyl-2-propenyl)-2,6-dimethyl-4-acetoxy-4-phenylpiperidine using 1-(3-phenyl-2-propenyl)-2,6-dimethyl-4-piperidone and acetic anhydride; and 1-(3-phenyl-2-propenyl)-3-methyl-4-propanoyloxy-4-phenylpiperidine using 1-(3-phenyl-2-propenyl)-3-methyl-4-piperidone and propanoic anhydride. These compounds can be isolated in their free base form or in the form of their acid addition salts, preferably the hydrochlorides.

Other 1-(aryl-alkenyl)-4-acyloxy-4-arylpiperidines that can be prepared following the above procedure for the preparation of 1-(3-phenyl-2-propenyl)-4-acetoxy-4-phenylpiperidine using the appropriate 1-(aryl-alkenyl)-4-piperidone, aryllithium and acylating agent are: 1-[3-(4-ethoxyphenyl)-2-propenyl]-4-propanoyloxy-4-(3-methylphenyl)-piperidine using 1-[3-(4-ethoxyphenyl)-2-propenyl]-4-piperidone, 3-methylphenyllithium and propanoic anhydride; 1-[3-(3-methylphenyl)-2-propenyl]-4-n-butanoyloxy-4-(3,4-diethoxyphenyl)piperidine using 1-[3-(3-methylphenyl)-2-propenyl]-4-piperidone, 3,4-diethoxyphenyllithium and n-butanoic anhydride; 1-[4-(3,4-dimethoxyphenyl)-2-butenyl]-4-benzoyloxy-4-(4-n-butoxyphenyl)piperidine using 1-[4-(3,4-dimethoxyphenyl)-2-butenyl]-4-piperidone, 3,4-dimethoxyphenyllithium and benzoyl chloride; 1-[3-(2-n-butoxy-4-n-hexylphenyl)-2-propenyl]-4-acetoxy-4-(3,4,5-trimethoxyphenyl)piperidine using 1-[3-(2-n-butoxy-4-n-hexylphenyl)-2-propenyl]-4-piperidone, 3,4,5-trimethoxyphenyllithium and acetic anhydride; 1-[3-(2,4,6-trimethylphenyl)-2-propenyl]-4-propanoyloxy-4-(2,4,6-trimethylphenyl)piperidine using 1-[3-(2,4,6-trimethylphenyl)-2-propenyl]-4-piperidone, 2,4,6-trimethylphenyllithium and propanoic anhydride; and the like. These compounds can be isolated in their free base form or in the form of their acid addition salts, preferably the hydrochlorides.

EXAMPLE 3

A. *1-(aryl-alkynyl)-4-piperidones*

The preparation of these compounds is illustrated by the following preparation of 1-(3-phenyl-2-propynyl)-4-piperidone which is prepared following the procedure described above in Example 2A for the preparation of the corresponding 1-(3-phenyl-2-propenyl)-4-piperidone, using 3-phenyl-2-propynylamine in place of 3-phenyl-2-propenylamine.

B. *1-(aryl-alkynyl)-4-acyloxy-4-phenylpiperidines*

The preparation of these compounds is illustrated by the synthesis of 1-(3-phenyl-2-propynyl)-4-acetoxy-4-phenylpiperidine following the procedure given hereinabove in Example 2B for the preparation of the corresponding 1-(3-phenyl-2-propenyl) compound using 1-(3-phenyl-2-propynyl)-4-piperidone in place of 1-(3-phenyl-2-propenyl)-4-piperidone. The resulting product can be isolated in free base form or in the form of its hydrochloride addition salt.

The chemical structure of my 1-[aryl-(polycarbon-lower-aliphatic)]-4-acyloxy-4-arylpiperidines is established by the mode of synthesis and corroborated by the correspondence of calculated and found values for the elementary analyses for representative examples.

My 1-[aryl-(polycarbon-lower-aliphatic)]-4-acyloxy-4-arylpiperidines can be formulated in the manner conventional for potent analgesics, e.g., in liquid preparations in an aqueous or aqueous-ethanol menstruum, or in solid form, e.g., as tablets or powders. The tablet formulations can be prepared using conventional excipients; and the powders can be dispensed in capsule form. These preparations can be administered orally or, in the case of the aqueous preparations, intramuscularly or intravenously.

I claim:

1. A composition of matter selected from the group consisting of: (a) 1-[aryl-(polycarbon-lower-aliphatic)]-4-(lower-carboxylic-acyloxy)-4-arylpiperidines; and, (b) acid addition salts thereof.

2. 1 - [phenyl - (polycarbon - lower - aliphatic)] - 4 - (lower alkanoyloxy)-4-phenylpiperidines.

3. A compound having the formula

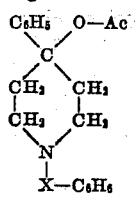

where X is a divalent aliphatic hydrocarbon radical having from two to six carbon atoms and having its free valence bonds on different carbon atoms, and Ac is an alkanoyl radical having from two to six carbon atoms.

4. An acid addition salt of the compound claimed in claim 3.

5. A compound having the formula

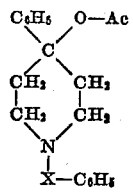

where X is an alkylene radical having from two to six carbon atoms and having its free valence bonds on different carbon atoms, and Ac is an alkanoyl radical having from two to six carbon atoms.

6. An acid addition salt of the compound claimed in claim 5.

7. A compound having the formula

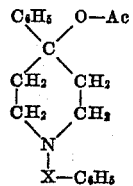

where X is a propenyl radical and Ac is an alkanoyl radical having from two to six carbon atoms.

8. An acid addition salt of the compound claimed in claim 7.

9. 1-(3-phenylpropyl)-4-acetoxy-4-phenylpiperidine.

10. 1 - (4 - phenylbutyl) - 4 - propanoyloxy - 4 - phenylpiperidine.

11. 1-(2-phenylethyl)-4-acetoxy-4-phenylpiperidine.

12. 1 - (3 - phenyl - 2 - propenyl) - 4 - acetoxy - 4 - phenylpiperidine.

13. 1 - (3 - phenylpropyl) - 4 acetoxy - 4 - phenylpiperidine hydrochloride.

14. 1 - (4 - phenylbutyl) - 4 - propanoyloxy - 4 - phenylpiperidine hydrochloride.

15. 1 - (2 - phenylethyl) - 4 - acetoxy - 4 - phenylpiperidine hydrochloride.

16. 1 - (3 - phenyl - 2 - propenyl) - 4 - acetoxy - 4 - phenylpiperidine hydrochloride.

17. A process for the preparation of 1-[aryl-(polycarbon - lower - aliphatic)] - 4 - (lower - carboxylic - acyloxy)-4-arylpiperidine which comprises: reacting 1-[aryl-(polycarbon-lower-aliphatic)]-4-piperidone with a compound selected from the group consisting of an aryl-lithium and an arylmagnesium halide; and reacting the resulting 1 - [aryl - (polycarbon - lower - aliphatic)] - 4-hydroxy-4-arylpiperidine with a lower-carboxylic acylating agent.

18. A process for the preparation of 1-[phenyl-(polycarbon - lower - aliphatic)] - 4 - (lower alkanoyloxy) - 4-phenylpiperidine which comprises: reacting 1-[phenyl-(polycarbon-lower-aliphatic)]-4-piperidone with phenyl-lithium; and reacting the resulting 1-[phenyl-(polycarbon-lower - aliphatic)] - 4 - hydroxy - 4 - phenylpiperidine as its lithium salt with a lower alkanoic anhydride.

19. A process for the preparation of a compound having the formula

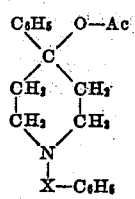

where X is a divalent aliphatic hydrocarbon radical having from two to six carbon atoms and having its free valence bonds on different carbon atoms, and Ac is an alkanoyl radical having from two to six carbon atoms, which comprises: reacting a 1-[phenyl-(polycarbon-lower-aliphatic)]-4-piperidone with phenyllithium; and reacting the resulting 1 - [phenyl - (polycarbon - lower - aliphatic)]-4-hydroxy-4-phenylpiperidine as its lithium salt with a lower alkanoic anhydride.

20. A process for the preparation of a compound having the formula

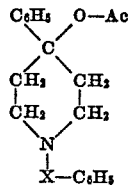

where X is an alkylene radical having from two to six carbon atoms and having its free valence bonds on different carbon atoms, and Ac is an alkanoyl radical having from two to six carbon atoms, which comprises: reacting a 1-(phenylalkyl)-4-piperidone with phenyllithium; and reacting the resulting 1 - (phenylalkyl) - 4 - hydroxy-4-phenylpiperidine as its lithium salt with a lower alkanoic anhydride.

21. A process for the preparation of a compound having the formula

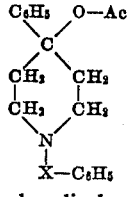

where X is a propenyl radical and Ac is an alkanoyl radical having from two to six carbon atoms, which comprises: reacting a 1-(phenyl-propenyl)-4-piperidone with phenyllithium; and reacting the resulting 1-(phenyl-propenyl) - 4 - hydroxy-4-phenylpiperidine as its lithium salt with a lower alkanoic anhydride.

22. A process for the preparation of 1-(3-phenyl-propyl)-4-acetoxy-4-phenylpiperidine which comprises: reacting 1-(3-phenylpropyl)-4-piperidone with phenyl-lithium; and reacting the resulting 1-(3-phenylpropyl)-4-hydroxy-4-phenylpiperidine as its lithium salt with acetic anhydride.

23. A process for the preparation of 1-(4-phenyl-butyl) - 4 - propanoyloxy-4-phenylpiperidine which comprises: reacting 1 - (4 - phenylbutyl)-4-piperidone with phenyllithium; and reacting the resulting 1-(4-phenyl-butyl)-4-hydroxy-4-phenylpiperidine as its lithium salt with propanoic anhydride.

24. A process for the preparation of 1-(2-phenylethyl)-4-acetoxy-4-phenylpiperidine which comprises: reacting 1-(2-phenylethyl)-4-piperidone with phenyllithium; and reacting the resulting 1 - (2 - phenylethyl)-4-hydroxy-4-phenylpiperidine as its lithium salt with acetic anhydride.

25. A process for the preparation of 1-(3-phenyl-2-propenyl)-4-acetoxy-4-phenylpiperidine which comprises: reacting 1 - (3 - phenyl - 2 - propenyl)-4-piperidone with phenyllithium; and reacting the resulting 1-(3-phenyl-2-propenyl) - 4 - hydroxy-4-phenylpiperidine as its lithium salt with acetic anhydride.

26. 1 - (3 - phenyl - 2 - propenyl)-4-propanoyloxy-4-phenylpiperidine hydrochloride.

27. A process for the preparation of 1-(3-phenyl-2-propenyl)-4-propanoyloxy-4-phenylpiperidine which comprises: reacting 1 - (3 - phenyl-2-propenyl)-4-piperidone with phenyllithium; and reacting the resulting 1-(3-phenyl - 2 - propenyl)-4-hydroxy-4-phenylpiperidine as its lithium salt with propanoic anhydride.

References Cited in the file of this patent
UNITED STATES PATENTS

| | | |
|---|---|---|
| 2,498,432 | Lee | Feb. 21, 1950 |
| 2,498,433 | Lee | Feb. 21, 1950 |

FOREIGN PATENTS

| | | |
|---|---|---|
| 60,592 | Denmark | Feb. 1, 1943 |

OTHER REFERENCES

Randall et al.: Journal of Pharmacology and Experimental Therapy, vol. 93, pages 314–328 (1948).